US012277450B2

(12) United States Patent
Hong et al.

(10) Patent No.: US 12,277,450 B2
(45) Date of Patent: Apr. 15, 2025

(54) METHOD FOR PROCESSING DATA USING COMPUTING ARRAY AND COMPUTING SYSTEM

(71) Applicant: Shanghai Biren Technology Co., Ltd, Shanghai (CN)

(72) Inventors: Zhou Hong, Shanghai (CN); ChengPing Luo, Shanghai (CN); Qin Zheng, Shanghai (CN)

(73) Assignee: Shanghai Biren Technology Co., Ltd, Shanghai (CN)

( * ) Notice: Subject to any disclaimer, the term of this patent is extended or adjusted under 35 U.S.C. 154(b) by 492 days.

(21) Appl. No.: 17/746,967

(22) Filed: May 18, 2022

(65) Prior Publication Data

US 2022/0374280 A1 Nov. 24, 2022

(30) Foreign Application Priority Data

May 18, 2021 (CN) .......................... 202110537558.3

(51) Int. Cl.
*G06F 9/50* (2006.01)
(52) U.S. Cl.
CPC .......... *G06F 9/5061* (2013.01); *G06F 9/5038* (2013.01)

(58) Field of Classification Search
CPC .................................................. G06F 9/5061
See application file for complete search history.

(56) References Cited

U.S. PATENT DOCUMENTS

| 5,495,606 A * | 2/1996 | Borden ............. G06F 15/17375 |
| 2021/0117810 A1 * | 4/2021 | Liu ........................... G06F 7/57 |

* cited by examiner

*Primary Examiner* — Charlie Sun
(74) *Attorney, Agent, or Firm* — JCIP GLOBAL INC.

(57) ABSTRACT

A method for processing data using a computing array is provided. In the method, source data is allocated to each of multiple computing nodes in a computing array. The source data includes multiple blocks. At a computing node among the computing nodes, in at least one iteration process, multiple blocks are respectively received from multiple other computing nodes other than the computing node among the computing nodes using multiple first type computing devices among a set of computing devices included in the computing node. A processing operation is executed on the received blocks using the first type computing devices respectively to generate multiple intermediate results. The processing operation is executed on the intermediate results to obtain a first part of a final result of executing the processing operation on the source data. A corresponding computer system is also provided.

18 Claims, 9 Drawing Sheets

METHOD FOR PROCESSING DATA USING COMPUTING ARRAY AND COMPUTING SYSTEM

CROSS-REFERENCE TO RELATED APPLICATION

This application claims the priority benefit of China application serial no. 202110537558.3, filed on May 18, 2021. The entirety of the above-mentioned patent application is hereby incorporated by reference herein and made a part of this specification.

BACKGROUND

Technical Field

The disclosure relates to the field of computing, and in particular to a method for processing data based on a computing array including multiple computing devices and a computing system.

Description of Related Art

With the development of computer technology, the amount of data to be processed involved in a computing system is increasing. In other to achieve data processing with higher efficiency, data may be processed in parallel by multiple computing devices. At present, a technical solution has been proposed in which multiple computing devices are connected to each other and each computing device respectively processes a part of the data to be processed. However, the existing connection manner requires each computing device to include enough connection ports. It should be understood that there is a limit to the number of connection ports of a computing device, and the greater the number of connection ports, the more difficult and costly the computing device is to manufacture. Further, the expansibility of the technical solutions in the prior art is not satisfactory, which results in the inability to expand according to requirements and use more computing devices to execute parallel processing. Therefore, a technical solution that can more fully use the connection ports of each computing device is to be developed, so as to use multiple computing devices to process data.

SUMMARY

The disclosure provides a technical solution for executing a processing operation using a computing array including multiple computing devices. Using the exemplary implementation of the disclosure, connection ports in the computing devices can be fully used, thereby implementing parallel data processing in a more efficient manner.

According to a first aspect of the disclosure, a method for executing a processing operation using a computing array is provided. The computing array includes multiple computing nodes, and a computing node among the computing nodes includes a set of computing devices. In a method, source data is allocated to each of the computing nodes in the computing array, the source data includes multiple blocks. At the computing node among the computing nodes, in at least one iteration process, multiple blocks are respectively received from other computing nodes other than the computing node among the computing nodes using multiple first type computing devices among the set of computing devices included in the computing node. A processing operation is executed on the received blocks using the first type computing devices respectively to generate multiple intermediate results. The processing operation is executed on the intermediate results to obtain a first part of a final result of executing the processing operation on the source data.

According to a second aspect of the disclosure, a computing system is provided. The computing system includes the computing array according to the first aspect of the disclosure; a processing unit; and a memory unit coupled to the processing unit. The memory unit includes a computer-executable instruction. When the computer-executable instruction is run by the processing unit, the processing unit executes the method according to the first aspect of the disclosure.

According to a third aspect of the disclosure, an apparatus for executing a processing operation using a computing array is provided. The apparatus includes a corresponding module for executing each step according to the first aspect of the disclosure.

It should be understood that the content described in this section is not intended to identify key or critical features of exemplary implementations of the disclosure or limit the scope of the disclosure. Other features of the disclosure will become readily understood from the following description.

BRIEF DESCRIPTION OF THE DRAWINGS

The above and other features, advantages, and the aspect of each exemplary implementation of the disclosure will become more apparent in conjunction with the accompanying drawings and with reference to the following detailed description. In the drawings, the same or similar reference numerals refer to the same or similar elements.

DETAILED DESCRIPTION OF DISCLOSED EMBODIMENTS

Exemplary implementations of the disclosure are described below in conjunction with the accompanying drawings, wherein details of the exemplary implementations of the disclosure are included to facilitate understanding and should be considered as exemplary only. Accordingly, persons skilled in the art should understand that changes and modifications can be made to the exemplary implementations described herein without departing from the scope and spirit of the disclosure. Also, the description of conventional functions and constructions are omitted from the following description for clarity and conciseness.

As used herein, the term "including" and variations thereof mean open-ended inclusion, that is, "including but not limited to". The term "or" means "and/or" unless specifically stated otherwise. The term "based on" means "at least partially based on". The terms "an exemplary embodiment" and "an embodiment" mean "at least one exemplary embodiment". The term "another embodiment" means "at least one additional embodiment". Terms such as "first" and "second" may refer to different objects or the same object. The following may also include other explicit and implicit definitions.

Figure 1A:
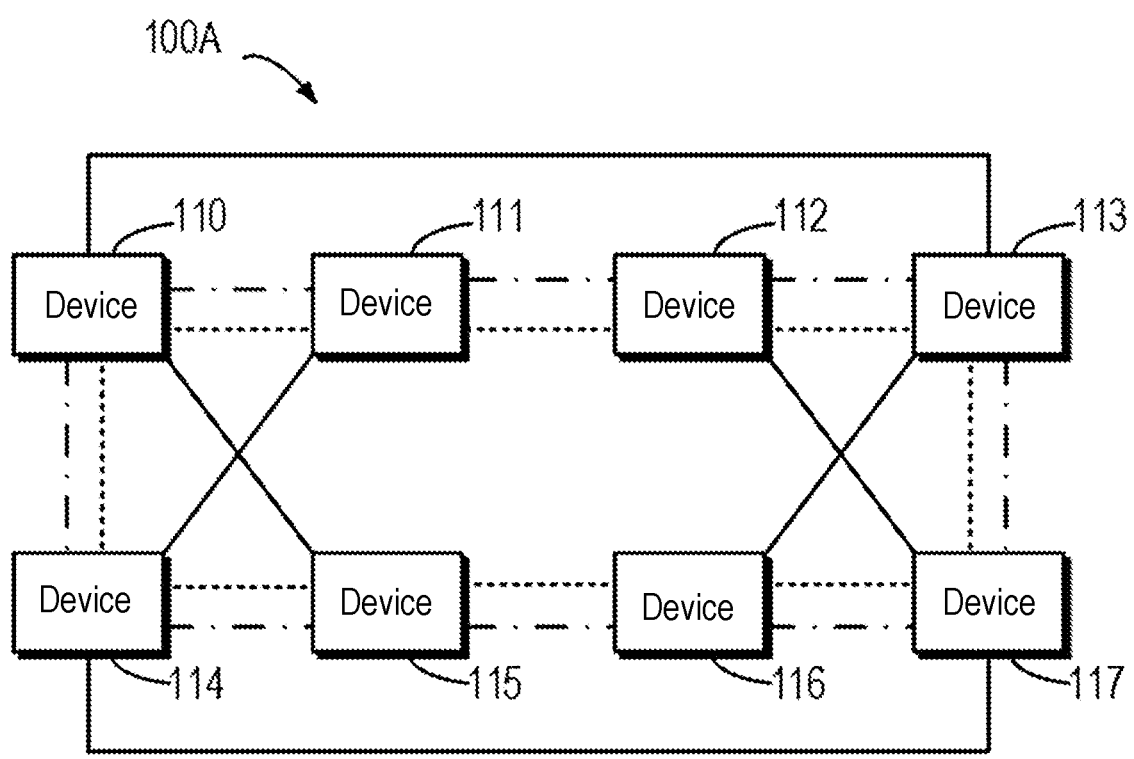
FIG. 1A, FIG. 1B, and FIG. 1C respectively schematically illustrate block diagrams of connection manners for connecting multiple computing devices.
Figure 1B:
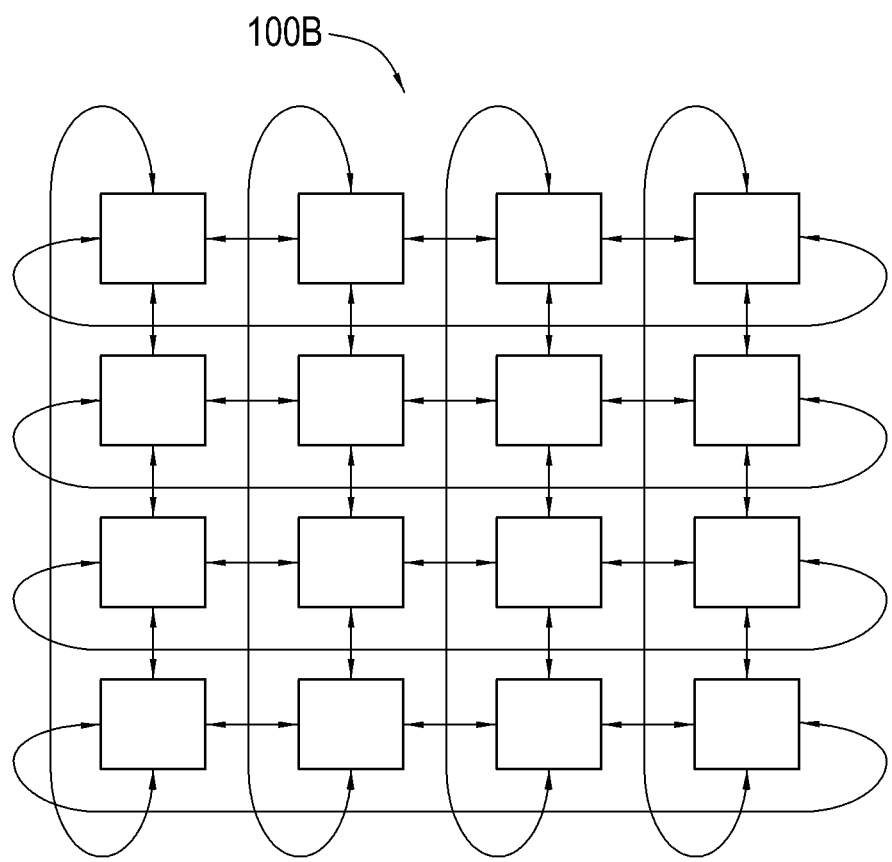
Figure 1C:
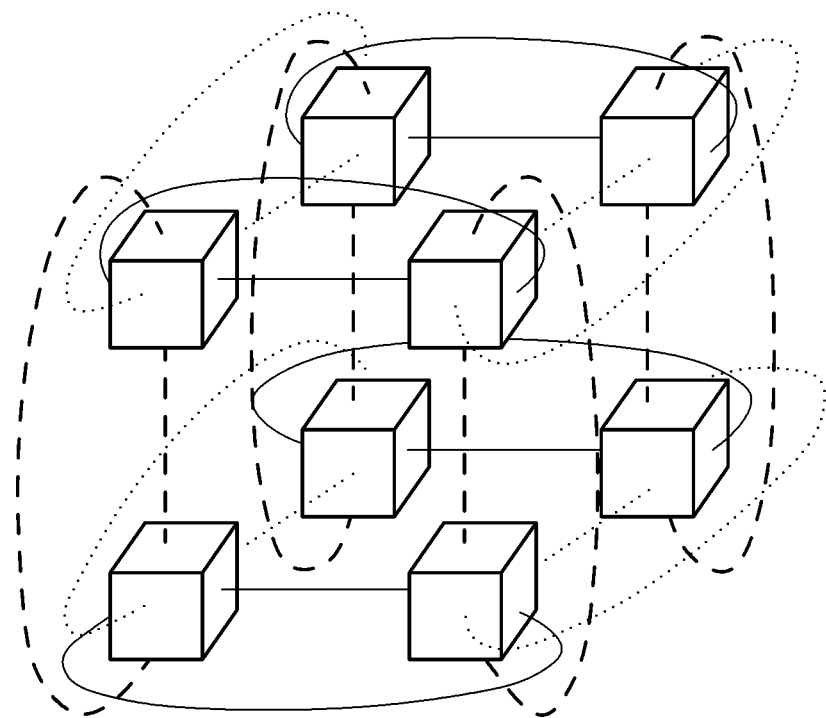

With the development of computer technology, the amount of data involved in a processing operation continues to increase, which makes it difficult for a single computing device to complete the processing operation within an acceptable time. At present, technical solutions have been proposed to connect multiple computing devices in an annular manner and execute processing operations in parallel in a distributed manner. For example, connection manners respectively shown in FIG. 1A, FIG. 1B, and FIG. 1C have been proposed so far. FIG. 1A schematically illustrates a block diagram 100A of a connection manner for connecting multiple computing devices. As shown in FIG. 1A, devices 110, 111, 112, 113, 114, 115, 116, and 117 are connected to one another via 3 loops (respectively shown in solid lines, dashed lines, and dot-dashed lines). Two computing devices need to be connected via connection ports. In the connection manner shown in FIG. 1A, each computing device needs to include at least 6 connection ports. Further, FIG. 1B and FIG. 1C respectively schematically illustrate block diagrams 100B and 100C of connection manners for connecting multiple computing devices. As shown in FIG. 1B, the computing devices are connected in a two-dimensional manner, and the two-dimensional manner requires each computing device to include at least 4 connection ports. As shown in FIG. 1C, the computing devices are connected in a three-dimensional manner, and the three-dimensional manner requires each computing device to include at least 6 connection ports.

It should be understood that there is a limit to the number of connection ports of a computing device, and the greater the number of connection ports, the more difficult and costly the computing device is to manufacture. Further, in the connection manner as shown in FIG. 1A to FIG. 1C, the expansibility is not satisfactory. For example, when more computing devices is to be added to the computing system, it is difficult to expand the existing connection loop, which causes the inability to use more computing devices to execute parallel processing.

In order to at least partially address the above-mentioned deficiencies of the technical solutions in the prior art, in an exemplary implementation of the disclosure, a method for executing a processing operation using a computing array is provided. According to an exemplary implementation of the disclosure, the concepts of a computing node and the computing array are presented. Here, the computing node may include multiple computing nodes connected in a loop, and the computing array may include multiple computing nodes connected to one another.

Figure 2:
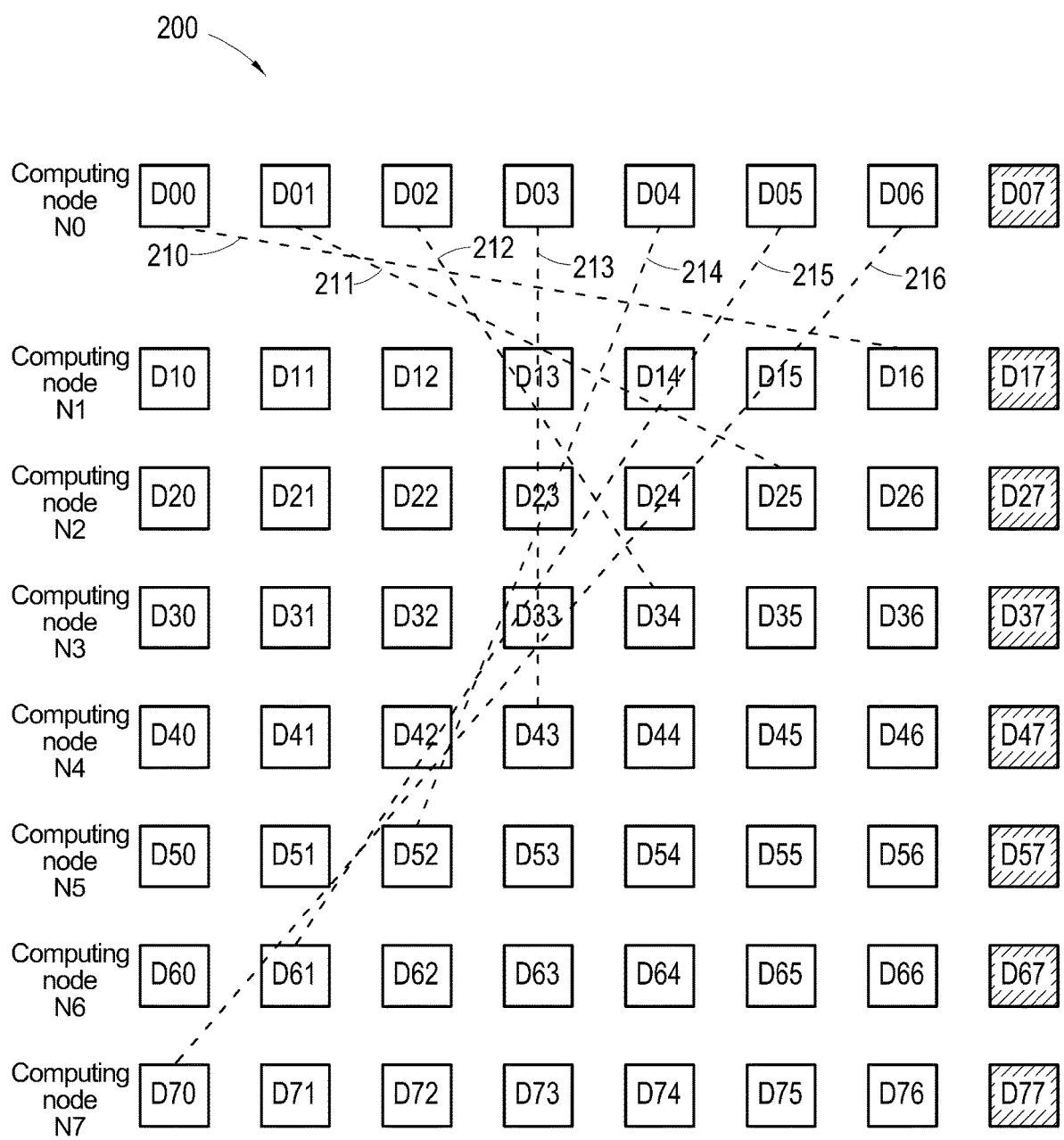
FIG. 2 schematically illustrates a block diagram of a computing array for executing a processing operation according to an exemplary implementation of the disclosure.

Firstly, an overview of an exemplary implementation according to the disclosure is described with reference to FIG. 2. FIG. 2 schematically illustrates a block diagram of a computing array 200 for executing a processing operation according to an exemplary implementation of the disclosure.

As shown in FIG. 2, a computing array 200 may include multiple computing nodes (respectively shown as computing nodes N0 to N7), and each computing node among the computing nodes includes a set of computing devices. As shown in FIG. 2, Dij represents the j-th computing device in the i-th computing node. For example, the computing node N0 may include computing devices D00, D01, D02, D03, D04, D05, D06, and D07. Similarly, other computing nodes may include the same number of other computing devices.

According to an exemplary implementation of the disclosure, the computing devices in the same computing node may be from the same or different physical devices. For example, the computing devices D00 to D07 may be graphics processing units (GPUs) deployed in the same physical device. As another example, the computing devices D00 to D07 may be GPUs deployed in two or more physical devices.

According to an exemplary implementation of the disclosure, the computing devices in a computing node may include two types, conventional computing devices (such as the computing devices D00 to D06 shown as blank boxes) and expandable computing devices (such as the computing devices D07 shown as a shaded box). The two types of computing devices may be both used to execute the processing operation, and the difference is that the expandable computing device may be expanded. For example, the computing device D07 may be expanded with a computing node including 8 computing devices (or a computing array including 8 computing nodes).

A part of the conventional computing devices in each computing node may be connected to each other. For the sake of convenience, FIG. 2 only schematically illustrates the connection manner of each computing device in the node N0 to each computing device in other computing nodes. Each computing device in each computing node may be connected in a similar manner. As shown in FIG. 2, the computing device D00 in the computing node N0 is coupled to a computing device D16 in the computing node N1 via a connection 210, the computing device D01 in the computing node N0 is coupled to a computing device D25 in the computing node N2 via a connection 211, the computing device D02 in the computing node N0 is coupled to a computing device D34 in the computing node N3 via a connection 212, the computing device D03 in the computing node N0 is coupled to a computing device D43 in the computing node N4 via a connection 213, the computing device D04 in the computing node N0 is coupled to a computing device D52 in the computing node N5 via a connection 214, the computing device D05 in the computing node N0 is coupled to a computing device D61 in the computing node N6 via a connection 215, and the computing device D06 in the computing node N0 is coupled to a computing device D70 in the computing node N7 via a connection 216.

It should be understood that the above-mentioned connections in FIG. 2 may support bidirectional data transmission. For example, the connection 210 may support data transmission from the computing device D00 to the computing device D16 and vice versa. Although not shown in FIG. 2, multiple computing devices in each computing node may be connected in a loop. In the context of the disclosure, the loop connection manner in the computing node is not limited. For example, multiple computing devices in the computing node may be connected based on any manner shown in FIG. 1A to FIG. 1C. With the computing array 200 shown in FIG. 2, each computing device only needs to provide one connection port to connect to other computing devices, thereby forming a computing array that may be used to provide a more powerful processing capability. In this way, the connection ports of each computing device can be fully used to provide parallel processing in a more efficient manner.

It should be understood that although FIG. 2 schematically illustrates a case where the computing array 200 includes 8 computing nodes, and each computing node includes 8 computing devices, according to an exemplary implementation of the disclosure, the computing array may include other numbers of computing nodes (for example, 4, 16, etc.).

According to an exemplary implementation of the disclosure, processing operations may be executed in parallel in a distributed manner based on the computing array 200 as shown in FIG. 2. In the context of the disclosure, a processing operation may include various operation types. For example, in a general computing environment and an artificial intelligence application environment, the processing operation may include an AllReduce operation. Here, the AllReduce operation is suitable for processing multiple data sets distributed in multiple different locations, and then distributing processed data to different locations. The typical AllReduce operation may include, but is not limited to, summation, maximum value, minimum value, multiplication, logical AND, logical OR, bitwise AND, and bitwise OR. The data to be processed may include, but is not limited to, a vector or a matrix. For ease of presentation, the process for executing a processing operation using a computing array will be described below with only summation as an example of the processing operation.

Figure 3:
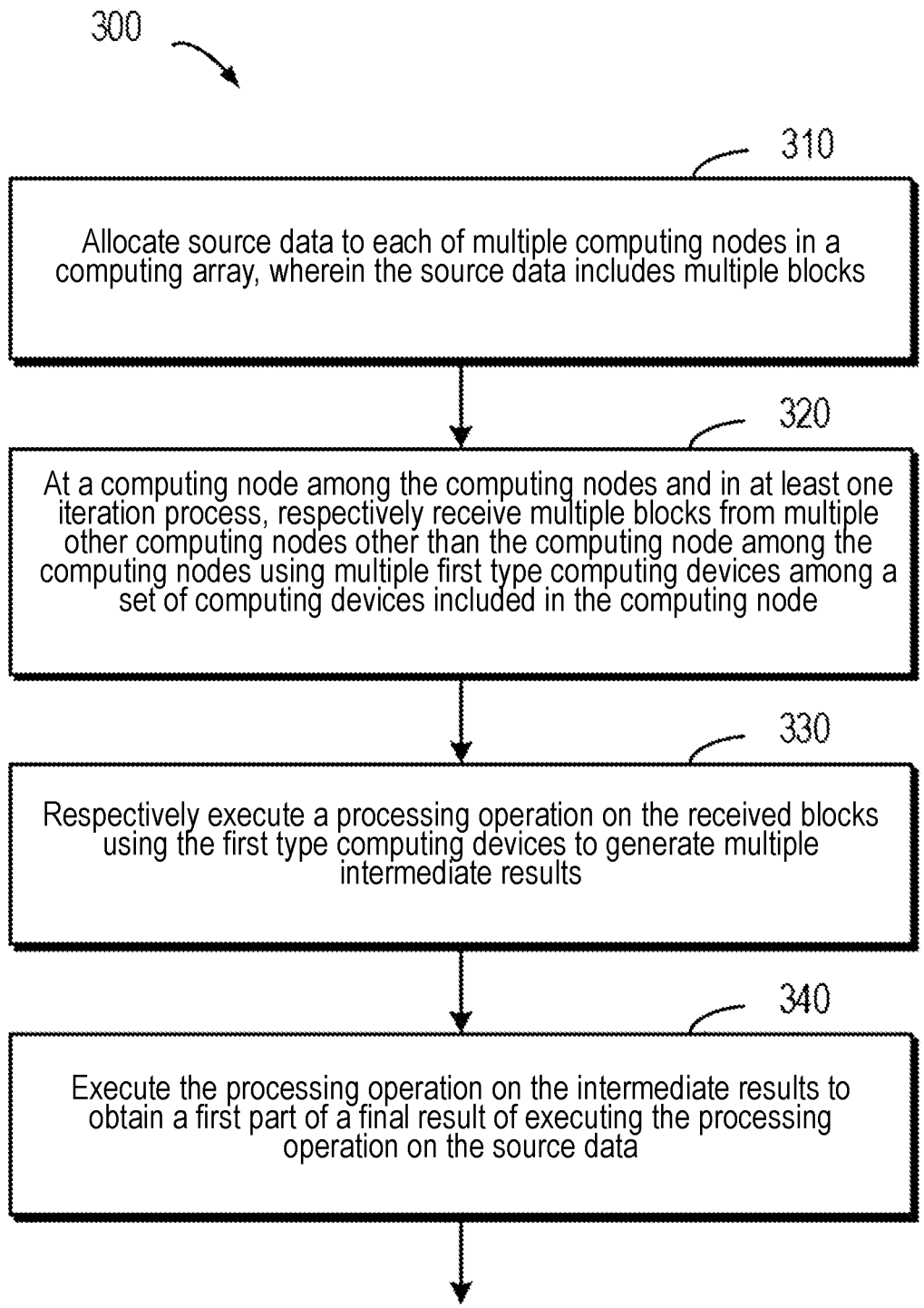
FIG. 3 schematically illustrates a flowchart of a method for executing a processing operation using a computing array according to an exemplary implementation of the disclosure.

More details will be described with reference to FIG. 3. FIG. 3 schematically illustrates a flowchart of a method 300 for executing a processing operation using a computing array according to an exemplary implementation of the disclosure. At a block 310, source data is allocated to each of the computing nodes in the computing array 200. According to an exemplary implementation of the disclosure, the number of computing nodes in the computing array 200 is equal to the number of computing devices in the computing node. For example, the computing array 200 includes 8 computing nodes N0 to N7, and each computing node includes 8 computing devices. According to an exemplary implementation of the disclosure, the type of the computing device is not limited, and the computing device may include, but is not limited to, a central processing unit, a central processing unit core, a graphics processing unit, etc.

It should be understood that the source data here refers to the data to be processed. For example, in a summation operation, the source data refers to the data to be summed. To execute the summation operation in a distributed manner, the source data may be divided into multiple blocks based on the number of computing nodes included in the computing array 200. For example, in the case where the computing array 200 includes 8 computing nodes, the source data may include 8×8=64 blocks.

The source data may be allocated to each computing device. At this time, each computing device includes 64 blocks. In different application environments, the source data may represent different meanings. For example, in the specific application environment of determining a cost function in machine learning technology, the source data may represent weight information (W) in a network. At this time, symbols Wij (where $0 \leq i$ and $j \leq 7$, that is, i and j are expressed in octal) may be respectively used to represent each block among the blocks. For example, W00 represents the 1-st set of weight data, W01 represents the 2-nd set of weight data, . . . , and W63 represents the 64-th set of weight data among 64 sets of weight data. After an allocation process, each computing device includes 64 blocks, W00 to W63.

It should be understood that actions executed at each computing device in each computing node are similar. For ease of description, the actions executed by each computing device at one computing node will be described with reference to FIG. 3. According to an exemplary implementation of the disclosure, steps shown in blocks 320 and 330 may be executed at the computing node in an iteration manner until a predetermined threshold for the number of iterations is reached. According to an exemplary implementation of the disclosure, the threshold for the number of iterations may be determined based on the number of computing nodes included in the computing array 200. Assuming that the computing array includes M (referred to as an array width for short) computing nodes, the threshold for the number of iterations may be expressed as M−1. In the computing array 200 shown in FIG. 2, the threshold for the number of iterations is 8−1=7. When the computing array 200 includes other numbers of computing nodes, the threshold for the number of iterations may be set to a different value.

At the block 320, at a computing node among the computing nodes, in at least one iteration process, multiple blocks from multiple other computing nodes other than the computing node among the computing nodes are respectively received using multiple first type computing devices among a set of computing devices included in the computing node. For ease of description, more details of the method 300 will be described by taking an iteration process executed at the computing node N0 as an example. The computing device N0 may respectively receive multiple blocks from corresponding computing devices among the other computing nodes (for example, the computing nodes N1 to N7) based on the connections 210 to 216 described above with reference to FIG. 2. More details regarding a receiving process will be described below with reference to FIG. 4.

Figure 4:
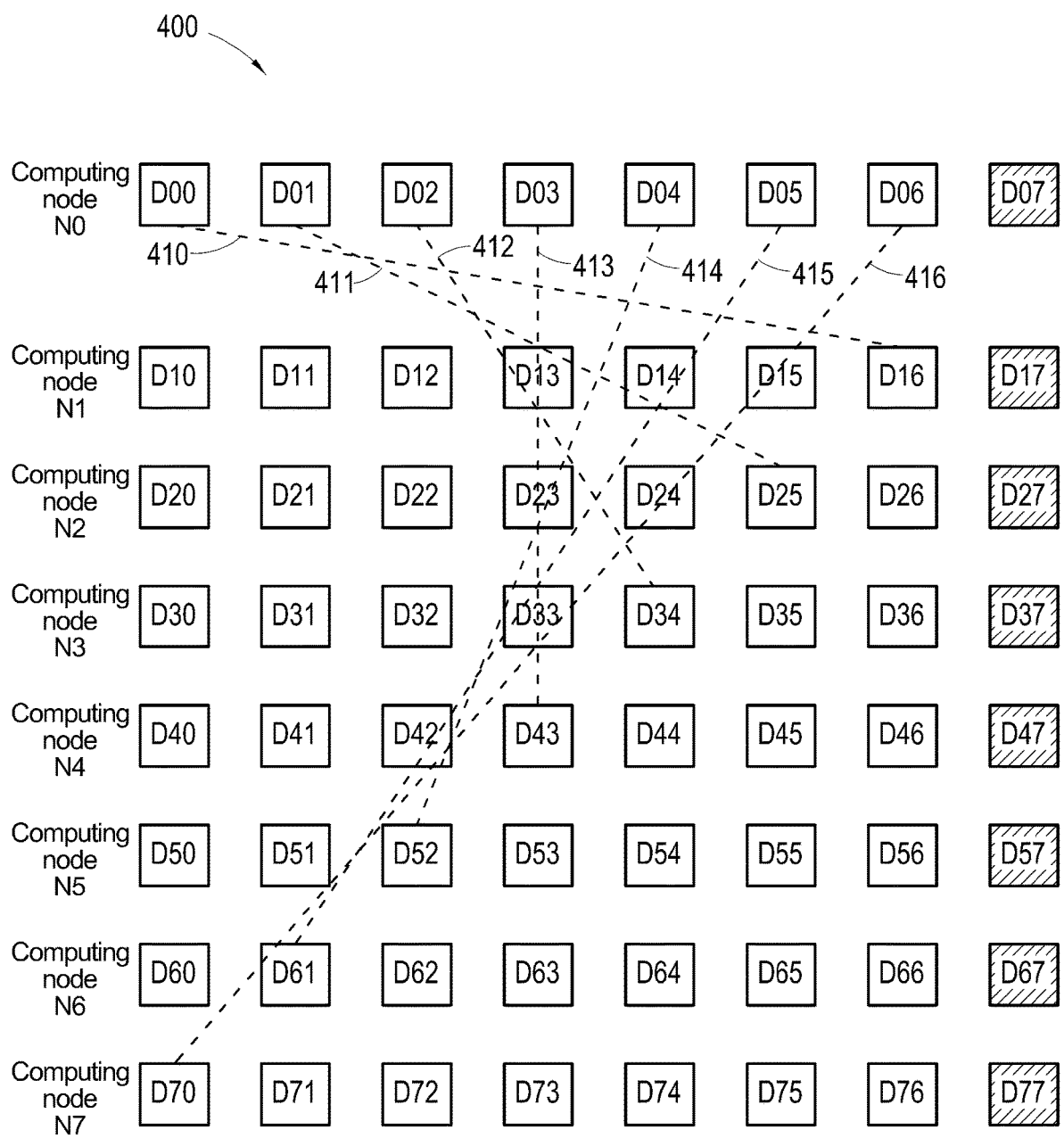
FIG. 4 schematically illustrates a block diagram of a process for executing a receiving action at a computing node according to an exemplary implementation of the disclosure.

FIG. 4 schematically illustrates a block diagram of a process 400 for executing a receiving action at a computing node according to an exemplary implementation of the disclosure. As shown in FIG. 4, each computing device in the computing node N0 may respectively receive blocks along directions indicated by arrows 410 to 416. As indicated by the arrow 410, the computing device D00 in the computing node N0 receives a block from the computing device D16 in the computing node N1; as indicated by the arrow 411, the computing device D01 receives a block from the computing device D25 in the computing node N2; as indicated by the arrow 412, the computing device D02 receives a block from the computing device D34 in the computing node N3; as indicated by the arrow 413, the computing device D03 receives a block from the computing device D43 in the computing node N4; as indicated by the arrow 414, the computing device D04 receives a block from the computing device D52 in the computing node N5; as indicated by the arrow 415, the computing device D05 receives a block from the computing device D61 in the computing node N6; and as indicated by the arrow 416, the computing device D06 receives a block from the computing device D70 in the computing node N7.

In the following, how to determine the above-mentioned correspondence between two computing devices will be described in detail. Here, the computing node N0 includes the conventional computing devices (the first type computing devices) D00 to D06 and the expandable computing device (the second type computing device) D07. The corresponding computing device may be determined for each conventional computing device in the computing node N0 one by one. Specifically, for a given computing device among the conventional computing devices D00 to D06, the corresponding computing device may be determined from multiple other computing nodes based on the device location of the given computing device in the computing node N0. Specifically, for multiple computing devices in the computing node N0, processing may be executed in a left-to-right direction according to the serial number of each computing device. The corresponding computing device of the computing device D00 may be first determined. As shown in FIG. 4, the computing device D00 is the 0-th computing device in the computing node N0, and the corresponding computing device of the computing device D00 may be selected from the computing node N1.

In the following, description will be given by taking the selection of the corresponding computing device from the computing node N1 as an example. As shown in FIG. 4, the computing node N1 is the 1-st computing node in the computing array 200. At this time, the corresponding computing device may be determined based on the node location ("1") of the computing node N1 in the computing array and the device location ("0") of the computing device D00 in the computing node N0. The corresponding computing device comes from the computing node N1, so the 1-st bit in an identifier of the corresponding computing device may be determined based on the node location. As shown in FIG. 4, the 2-nd bit in the identifier of the corresponding computing device may be determined based on the device location, the node location, and the array width. Using the exemplary implementation of the disclosure, the corresponding computing device of each computing device may be determined based on only simple mathematical operations.

Specifically, the above method may be used to determine that the corresponding computing device of D00 is D16, the corresponding computing device of D01 is D25, the corresponding computing device of D02 is D34, the corresponding computing device of D03 is D43, the corresponding computing device of D04 is D52, the corresponding computing device of D05 is D61, and the corresponding computing device of D06 is D70. In the following, how to determine the corresponding computing device of any computing device Dij in the computing array 200 will be described. For the computing device Dij, a corresponding computing device Di'j' may be determined based on the following formulae: i'=(i+1+j) mod M (where mod is a modulo operation), and j'=M−j−2.

According to an exemplary implementation of the disclosure, a corresponding block among the blocks may be received from a corresponding computing device. For example, the computing device Dij may receive a block from the corresponding computing device Di'j'. In particular, the block associated with the location of the given computing device Dij in the computing array may be received from the corresponding computing device Di'j'. The receiving processes shown above are executed in parallel. In other words, the computing devices D00, D01, D02, D03, D04, D05, D06, and D07 may respectively receive blocks from the corresponding computing devices D16, D25, D34, D43, D52, D61, and D70 in parallel.

Figure 5:
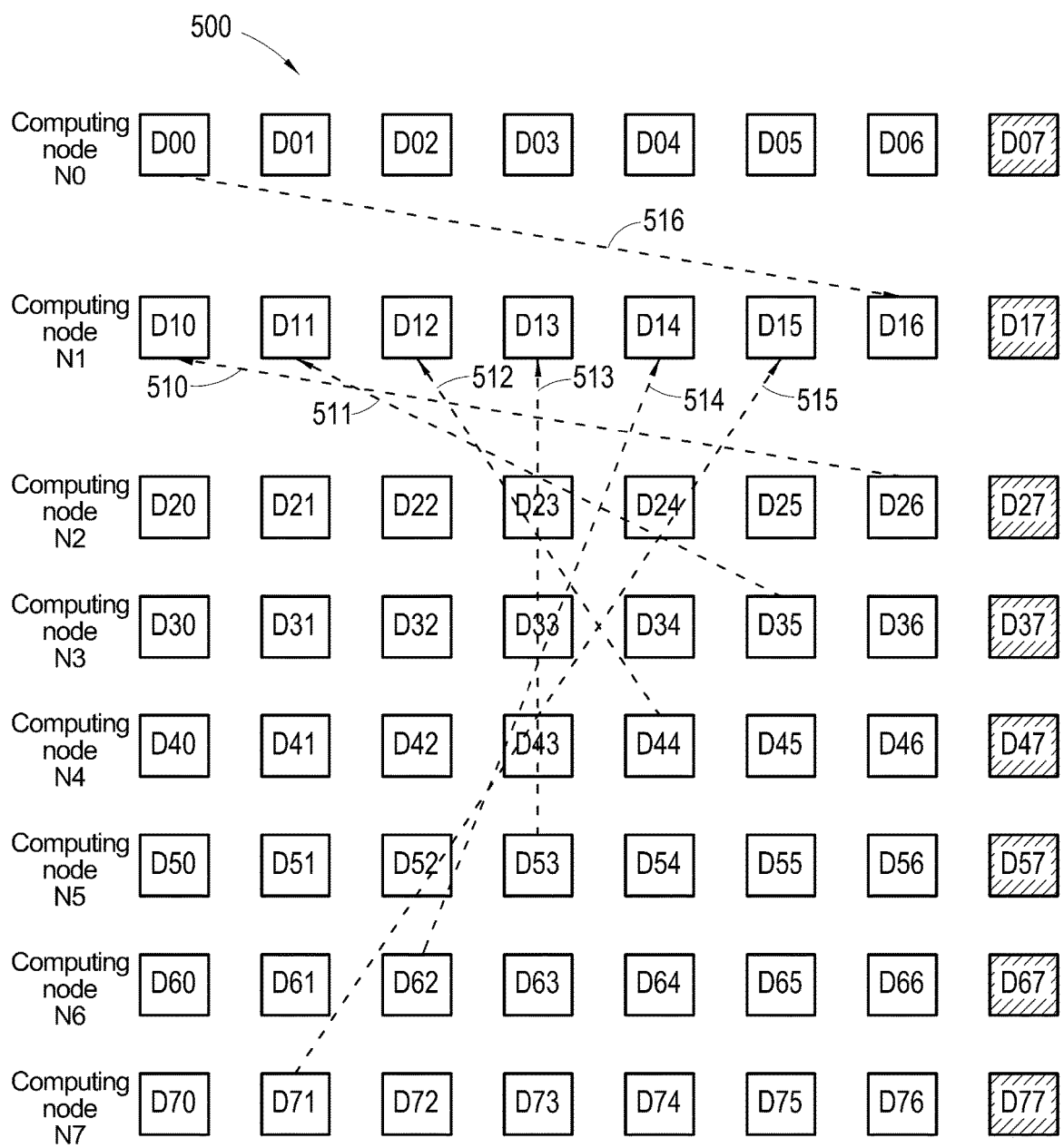
FIG. 5 schematically illustrates a block diagram of a process for executing a receiving action at another computing node according to an exemplary implementation of the disclosure.

It should be understood that the above only describes the actions executed at one computing node by taking the receiving process for each computing device in the computing node N0 as an example. Each computing device in each computing node may operate in a similar manner to receive a corresponding block from a corresponding computing device. In the following, the receiving process at another computing node N1 will be described with reference to FIG. 5. FIG. 5 schematically illustrates a block diagram of a process 500 for executing a receiving action at another computing node according to an exemplary implementation of the disclosure.

It should be understood that the connection between various computing devices in the computing array 200 may support bidirectional communication. Specifically, the connection 210 in FIG. 2 may support communication (from D16 to D00) in one direction as shown by an arrow 410 in FIG. 4 and may also support communication (from D00 to D16) in one direction as shown by an arrow 516 in FIG. 5. Using the exemplary implementation of the disclosure, connections between various computing devices and connection ports in each computing device may be reused. In this way, limited connection ports may be used to support more communication loops, thereby providing a more efficient parallel computing capability.

The corresponding computing device may be determined for each computing device in the computing node N1 based on the method described above, thereby determining which computing device to receive the corresponding block from. In the example of FIG. 5, corresponding blocks may be received along directions as indicated by arrows 510 to 516. As indicated by the arrow 510, the computing device D10 in the computing node N1 receives a block from the computing device D26 in the computing node N2; as indicated by the arrow 511, the computing device D11 receives a block from the computing device D35 in the computing node N3; as indicated by the arrow 512, the computing device D12 receives a block from the computing device D44 in the computing node N4; as indicated by the arrow 513, the computing device D13 receives a block from the computing device D53 in the computing node N5; as indicated by the arrow 514, the computing device D14 receives a block from the computing device D62 in the computing node N6; as indicated by the arrow 515, the computing device D15 receives a block from the computing device D71 in the computing node N7; and as indicated by the arrow 516, the computing device D16 receives a block from the computing device D00 in the computing node N0.

According to an exemplary implementation of the disclosure, each computing device in the computing array 200 may determine the corresponding computing device according to the method described above, and receive the corresponding block from the corresponding computing device. In the following, how to process the received corresponding block will be described by returning to FIG. 3. At the block 330 of FIG. 3, the processing operation is respectively executed on the received blocks using the first type computing devices to generate multiple intermediate results. The action shown at the block 330 may be referred to as an induction action. Each computing device in the computing node N0 may execute the induction action in a similar manner. In particular, the processing operation may be executed based on the block associated with the location of the given computing device in the computing array among the blocks at the given computing device and the received corresponding block, so as to generate an intermediate result among the intermediate results at the given computing device.

For example, at the computing device D00, an accumulation operation may be executed for the block W00 at D00 and the corresponding block W00 received from the corresponding computing device D16, so as to generate the intermediate result. The previous block W00 at D00 may be replaced with the generated intermediate result. In other words, the intermediate result may be written to a storage space for storing the previous block W00. For another example, at the computing device D01, the accumulation operation may be executed for the block W01 at D01 and the corresponding block W01 received from the corresponding computing device D25, so as to generate the intermediate result. The previous block W01 at D01 may be replaced with the generated intermediate result. In other words, the intermediate result may be written to the storage space for storing the previous block W01.

It should be understood that the operations executed at two computing devices are only schematically shown above, and that operations executed at other computing devices are similar. For example, the operation executed at each computing device in the computing node N0 may be controlled based on codes as follows.

TABLE 1

Codes for controlling induction action in
computing node N0 (first iteration process)

N0.DEVICE0: {N0.DEVICE0.W00, N1.DEVICE6.W00} --> N0.DEVICE0.W00;
N0.DEVICE1: {N0.DEVICE1.W01, N2.DEVICE5.W01} --> N0.DEVICE1.W01;
N0.DEVICE2: {N0.DEVICE2.W02, N3.DEVICE4.W02} --> N0.DEVICE2.W02;
N0.DEVICE3: {N0.DEVICE3.W03, N4.DEVICE3.W03} --> N0.DEVICE3.W03;
N0.DEVICE4: {N0.DEVICE4.W04, N5.DEVICE2.W04} --> N0.DEVICE4.W04;
N0.DEVICE5: {N0.DEVICE5.W05, N6.DEVICE1.W05} --> N0.DEVICE5.W05;
N0.DEVICE6: {N0.DEVICE6.W06, N7.DEVICE0.W06} --> N0.DEVICE6.W06;

For example, the first row code "N0.DEVICE0: {N0.DEVICE0.W00, N1.DEVICE6.W00}→N0.DEVICE0.W00" in Table 1 means that the following actions are executed at the 0-th computing device (that is, at D00) in the computing node N0. The block W00 in the 0-th computing device in the computing node N0 and the block W00 received from the 6-th computing device (that is, D16) in the computing node N1 are summed up, and the intermediate result obtained by the summation is written to the storage space for storing W00 of the 0-th computing device in the computing node N0. It should be understood that the codes in Table 1 above may be used to control each conventional computing device in the computing node N0. Other computing devices in other computing nodes may be controlled in a similar manner. For example, the induction action executed at each computing devices in the computing nodes N1 to N3 may be controlled based on codes shown in Table 2 to Table 4 below. Corresponding code may be written based on the principle described above, so as to control the action executed at each computing device in the other computing nodes N4 to N7.

TABLE 2

Codes for controlling induction action in
computing node N1 (first iteration process)

N1.DEVICE0: {N1.DEVICE0.W12, N2.DEVICE6.W12} --> N1.DEVICE0.W12;
N1.DEVICE1: {N1.DEVICE1.W13, N3.DEVICE5.W13} --> N1.DEVICE1.W13;
N1.DEVICE2: {N1.DEVICE2.W14, N4.DEVICE3.W14} --> N1.DEVICE2.W14;
N1.DEVICE3: {N1.DEVICE3.W15, N5.DEVICE2.W15} --> N1.DEVICE3.W15;
N1.DEVICE4: {N1.DEVICE4.W16, N6.DEVICE1.W16} --> N1.DEVICE4.W16;
N1.DEVICE5: {N1.DEVICE5.W17, N7.DEVICE0.W17} --> N1.DEVICE5.W17;
N1.DEVICE6: {N1.DEVICE6.W10, N0.DEVICE0.W10} --> N1.DEVICE6.W10;

TABLE 3

Codes for controlling induction action in
computing node N2 (first iteration process)

N2.DEVICE0: {N2.DEVICE0.W24, N3.DEVICE6.W24} --> N2.DEVICE0.W24;
N2.DEVICE1: {N2.DEVICE1.W25, N4.DEVICE5.W25} --> N2.DEVICE1.W25;
N2.DEVICE2: {N2.DEVICE2.W26, N5.DEVICE3.W26} --> N2.DEVICE2.W26;
N2.DEVICE3: {N2.DEVICE3.W27, N6.DEVICE2.W27} --> N2.DEVICE3.W27;
N2.DEVICE4: {N2.DEVICE4.W20, N7.DEVICE1.W20} --> N2.DEVICE4.W20;
N2.DEVICE5: {N2.DEVICE5.W21, N0.DEVICE0.W21} --> N2.DEVICE5.W21;
N2.DEVICE6: {N2.DEVICE6.W22, N1.DEVICE0.W22} --> N2.DEVICE6.W22;

TABLE 4

Codes for controlling induction action in
computing node N3 (first iteration process)

N3.DEVICE0: {N3.DEVICE0.W36, N4.DEVICE6.W34} --> N2.DEVICE0.W24;
N3.DEVICE1: {N3.DEVICE1.W37, N5.DEVICE5.W35} --> N2.DEVICE1.W25;

TABLE 4-continued

Codes for controlling induction action in
computing node N3 (first iteration process)

N3.DEVICE2: {N3.DEVICE2.W30, N6.DEVICE3.W36} --> N2.DEVICE2.W26;
N3.DEVICE3: {N3.DEVICE3.W31, N7.DEVICE2.W37} --> N2.DEVICE3.W27;
N3.DEVICE4: {N3.DEVICE4.W32, N0.DEVICE1.W30} --> N2.DEVICE4.W20;
N3.DEVICE5: {N3.DEVICE5.W33, N1.DEVICE0.W31} --> N2.DEVICE5.W21;
N3.DEVICE6: {N3.DEVICE6.W34, N2.DEVICE0.W32} --> N2.DEVICE6.W22;

The specific processes of the induction actions executed at the computing nodes N0 to N3 in one iteration process have been described above with reference to Table 1 to Table 4. In the iteration process, after the induction action is executed, a moving action needs to be executed at each computing node. In the moving action, multiple first type computing devices may be instructed to respectively transmit multiple intermediate results to multiple next computing devices in the computing node, so as to respectively update blocks corresponding to the locations of the first type computing devices at the next computing devices.

Figure 6:
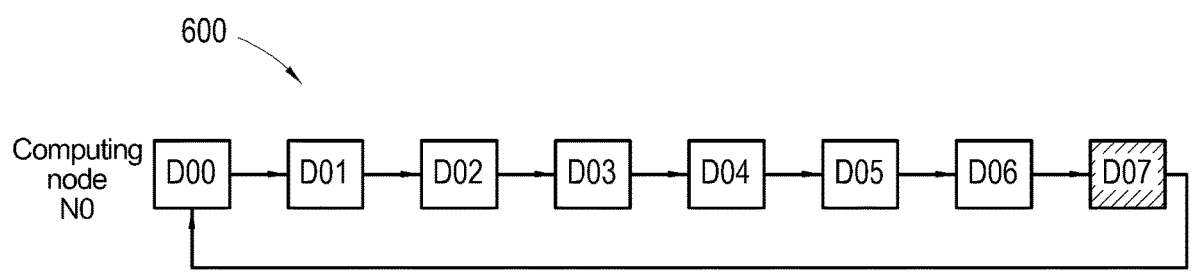
FIG. 6 schematically illustrates a block diagram of a process for executing a moving action at a computing node according to an exemplary implementation of the disclosure.

According to an exemplary implementation of the disclosure, the moving action may be executed using a loop in a computing node. In the following, more details regarding the moving action will be described with reference to FIG. 6. FIG. 6 schematically illustrates a block diagram of a process 600 for executing a moving action at a computing node according to an exemplary implementation of the disclosure. The moving actions executed at each computing node are similar, and FIG. 6 only describes the moving action at the computing node N0 as an example.

As shown in FIG. 6, each computing device may transmit the local intermediate result to the next computing device to update the corresponding block in the next computing device (for example, the computing device to the right). For example, D00 may transmit the local intermediate result (which is written to the storage space where W00 is at) to the computing device D01, so as to update the storage space where the previous W00 is at in the computing device D01. D01 may transmit the local intermediate result (which is written to the storage space where W01 is at) to the computing device D02, so as to update the storage space where the previous W01 is at in the computing device D02. According to an exemplary implementation of the disclosure, the moving action executed at each computing device in the computing node N0 may be controlled based on codes shown in Table 5 below.

TABLE 5

Codes for controlling moving action in computing
node N0 (first iteration process)

N0.DEVICE0: {N0.DEVICE0.W00} --> {N0.DEVICE1.W00};
N0.DEVICE1: {N0.DEVICE1.W01} --> {N0.DEVICE2.W01};
N0.DEVICE2: {N0.DEVICE2.W02} --> {N0.DEVICE3.W02};
N0.DEVICE3: {N0.DEVICE3.W03} --> {N0.DEVICE4.W03};
N0.DEVICE4: {N0.DEVICE4.W04} --> {N0.DEVICE5.W04};
N0.DEVICE5: {N0.DEVICE5.W05} --> {N0.DEVICE6.W05};
N0.DEVICE6: {N0.DEVICE6.W06} --> {N0.DEVICE7.W06};
N0.DEVICE7: {N0.DEVICE7.W07} --> {N0.DEVICE0.W07};

For example, the first row code "N0.DEVICE0: {N0.DEVICE0.W00}→{N0.DEVICE1.W00}" in Table 5 means that the following actions are executed at the 0-th computing device (that is, at D00) in the computing node N0. The block W00 in the 0-th computing device in the computing node N0 is written to the storage space for storing W00 of the 1-st computing device (that is, at D01) in the computing node N0. Further, W01 in D01 may be used to overwrite W01 in D02, W02 in D02 may be used to overwrite W02 in D03, and so on.

It should be understood that the above codes merely illustrate the function executed at each computing device in the computing node N0. The above function may be implemented based on the specific application environment. It should be understood that the codes in Table 5 above may be used to control each computing device in the computing node N0. Other computing devices in other computing nodes may be controlled in a similar manner. For example, the moving action in the computing node N1 may be controlled based on codes shown in Table 6 below. Corresponding codes may be written to control an operation executed at each computing devices in the other computing nodes N2 to N7 based on the principle described above.

TABLE 6

Codes for controlling moving action in computing
node N1 (first iteration process)

N1.DEVICE0: {N1.DEVICE0.W12} --> {N1.DEVICE1.W12};
N1.DEVICE1: {N1.DEVICE1.W13} --> {N1.DEVICE2.W13};
N1.DEVICE2: {N1.DEVICE2.W14} --> {N1.DEVICE3.W14};
N1.DEVICE3: {N1.DEVICE3.W15} --> {N1.DEVICE4.W15};
N1.DEVICE4: {N1.DEVICE4.W16} --> {N1.DEVICE5.W16};
N1.DEVICE5: {N1.DEVICE5.W17} --> {N1.DEVICE6.W17};
N1.DEVICE6: {N1.DEVICE6.W10} --> {N1.DEVICE7.W10};
N1.DEVICE7: {N1.DEVICE7.W11} --> {N1.DEVICE0.W11};

Details of the induction action and the moving action executed in one iteration process are described above. In the first iteration process, the induction action and the moving action described above may be executed at each computing device in each computing node. After the first iteration process, certain blocks in each computing device are updated. According to an exemplary implementation of the disclosure, if it is determined that the number of times of the iteration process being executed does not reach a predetermined threshold, the next iteration process is executed at the computing node. The predetermined threshold is determined based on the number of computing nodes. In other words, a second iteration process, a third iteration process, . . . may be executed based on updated blocks until the predetermined threshold for the number of iterations is reached.

In the following, multiple iteration processes to be subsequently executed will be described by continuing to take the computing node N0 as an example. In the second iteration process, the computing devices D00, D01, D02, D03, D04, D05, D06, and D07 in the computing node N0 may respectively receive multiple updated blocks from multiple other computing nodes. It should be understood that the manner of determining a corresponding computing device for a given computing device in the second iteration process is similar to the description above. The difference from the first iteration process is that since the first iteration process has been executed at each computing device in other computing nodes, data in the corresponding block is data that has been updated.

Then, according to the above-mentioned process, the processing operation is respectively executed on the received updated blocks using multiple first type computing devices to generate multiple updated intermediate results. In particular, the induction action may be executed at each conventional computing device in the computing node N0 in a manner similar to the description above. Specifically, the induction action in the computing node N0 may be controlled based on codes shown in Table 7 below.

TABLE 7

Codes for controlling induction action in computing node N0 (second iteration process)

N0.DEVICE0: {N0.DEVICE0.W07, N1.DEVICE6.W07} --> N0.DEVICE0.W07;
N0.DEVICE1: {N0.DEVICE1.W00, N2.DEVICE5.W00} --> N0.DEVICE1.W00;
N0.DEVICE2: {N0.DEVICE2.W01, N3.DEVICE4.W01} --> N0.DEVICE2.W01;
N0.DEVICE3: {N0.DEVICE3.W02, N4.DEVICE3.W02} --> N0.DEVICE3.W02;
N0.DEVICE4: {N0.DEVICE4.W03, N5.DEVICE2.W03} --> N0.DEVICE4.W03;
N0.DEVICE5: {N0.DEVICE5.W04, N6.DEVICE1.W04} --> N0.DEVICE5.W04;
N0.DEVICE6: {N0.DEVICE6.W05, N7.DEVICE0.W05} --> N0.DEVICE6.W05

TABLE 8

Codes for controlling induction action in computing node N1 (second iteration process)

N1.DEVICE0: {N1.DEVICE0.W11, N2.DEVICE6.W11} --> N1.DEVICE0.W11;
N1.DEVICE1: {N1.DEVICE1.W12, N3.DEVICE5.W12} --> N1.DEVICE1.W12;
N1.DEVICE2: {N1.DEVICE2.W13, N4.DEVICE3.W13} --> N1.DEVICE2.W13;
N1.DEVICE3: {N1.DEVICE3.W14, N5.DEVICE2.W14} --> N1.DEVICE3.W14;
N1.DEVICE4: {N1.DEVICE4.W15, N6.DEVICE1.W15} --> N1.DEVICE4.W15;
N1.DEVICE5: {N1.DEVICE5.W16, N7.DEVICE0.W16} --> N1.DEVICE5.W16;
N1.DEVICE6: {N1.DEVICE6.W17, N0.DEVICE0.W17} --> N1.DEVICE6.W17;

TABLE 9

Codes for controlling induction action in computing node N2 (second iteration process)

N2.DEVICE0: {N2.DEVICE0.W23, N3.DEVICE6.W23} --> N2.DEVICE0.W23;
N2.DEVICE1: {N2.DEVICE1.W24, N4.DEVICE5.W24} --> N2.DEVICE1.W24;
N2.DEVICE2: {N2.DEVICE2.W25, N5.DEVICE3.W25} --> N2.DEVICE2.W25;
N2.DEVICE3: {N2.DEVICE3.W26, N6.DEVICE2.W26} --> N2.DEVICE3.W26;
N2.DEVICE4: {N2.DEVICE4.W27, N7.DEVICE1.W27} --> N2.DEVICE4.W27;
N2.DEVICE5: {N2.DEVICE5.W20, N0.DEVICE0.W20} --> N2.DEVICE5.W20;
N2.DEVICE6: {N2.DEVICE6.W21, N1.DEVICE0.W21} --> N2.DEVICE6.W21;

TABLE 10

Codes for controlling induction action in computing node N3 (second iteration process)

N3.DEVICE0: {N3.DEVICE0.W35, N4.DEVICE6.W35} --> N2.DEVICE0.W25;
N3.DEVICE1: {N3.DEVICE1.W36, N5.DEVICE5.W36} --> N2.DEVICE1.W26;
N3.DEVICE2: {N3.DEVICE2.W37, N6.DEVICE3.W37} --> N2.DEVICE2.W27;
N3.DEVICE3: {N3.DEVICE3.W30, N7.DEVICE2.W30} --> N2.DEVICE3.W20;
N3.DEVICE4: {N3.DEVICE4.W31, N0.DEVICE1.W31} --> N2.DEVICE4.W21;
N3.DEVICE5: {N3.DEVICE5.W32, N1.DEVICE0.W32} --> N2.DEVICE5.W22;
N3.DEVICE6: {N3.DEVICE6.W33, N2.DEVICE0.W33} --> N2.DEVICE6.W23;

In the second iteration process, after the induction action is completed, the moving action may be executed at each computing device in the computing node N0 according to the manner described above. At this time, the intermediate results in the second iteration include the summation of more blocks from the source data. According to an exemplary implementation of the disclosure, the subsequent third iteration process, fourth iteration process, . . . may continue to be executed until the number of iterations reaches the predetermined threshold (7 times). It should be understood that the above only schematically illustrates the specific actions in the first iteration process and the second iteration process. Subsequent iteration processes may be executed based on a similar manner. After the 7-th iteration process is completed, the intermediate result at each computing device includes a part of a final result. That is, for the computing array 200 including 64 computing devices, each computing device includes 1/64 of the final result.

Returning to FIG. 3, at a block 340, the processing operation is executed on the intermediate results to obtain a first part of a final result of executing the processing operation on the source data. That is, 1/8 (1/64×8=1/8) of the final result may be determined based on the intermediate results at the 8 computing devices in the computing node N0. In the following, the high-end distribution of the final result in each computing device will be described in detail. W01 in D00 includes 1/64 of the final result, W02 in D01 includes 1/64 of the final result, W03 in D02 includes 1/64 of the final result, W04 in D03 includes 1/64 of the final result 64, W05 in D04 includes 1/64 of the final result, W06 in D05 includes 1/64 of the final result, W07 in D06 includes 1/64 of the final result, and W00 in D07 includes 1/64 of the final result.

It should be understood that the details of the iteration processes executed at one computing node are described above using only the computing node N0 as an example. Similar actions may be executed at each computing node in the computing array 200 in a similar manner, so as to respectively generate the corresponding 1/8 of the final result by each computing node. For example, at the computing node N0, the 1-st 1/8 data in the final result may be obtained; at the computing node N1, the 2-nd 1/8 data in the final result may be obtained; . . . ; and at the computing node N7, the 8-th 1/8th data in the final result may be obtained. Specifically, Table 11 below illustrates the location of the final result in each computing device.

TABLE 11

Distribution of final results in various computing devices

|  | Device 0 | Device 1 | Device 2 | Device 3 | Device 4 | Device 5 | Device 6 | Device 7 |
| --- | --- | --- | --- | --- | --- | --- | --- | --- |
| Node 0 | W01 | W02 | W03 | W04 | W05 | W06 | W07 | W00 |
| Node 1 | W13 | W14 | W15 | W16 | W17 | W10 | W11 | W12 |
| Node 2 | W25 | W26 | W27 | W20 | W21 | W22 | W23 | W24 |
| Node 3 | W37 | W30 | W31 | W32 | W33 | W34 | W35 | W36 |
| Node 4 | W41 | W42 | W43 | W44 | W45 | W46 | W47 | W40 |
| Node 5 | W53 | W54 | W55 | W56 | W57 | W50 | W51 | W52 |
| Node 6 | W65 | W66 | W67 | W60 | W61 | W62 | W63 | W64 |
| Node 7 | W77 | W70 | W71 | W72 | W73 | W74 | W75 | W76 |

In Table 11, the rows represent the node serial numbers and the columns represent the device serial numbers. For example, the box at the intersection of the row "Node i" and the column "Device j" represents the location of the final result included in the j-th device in the computing node N1 (that is, Dij). For example, the box at the intersection of the row "Node 0" and the column "Device 0" represents that W01 in D00 includes 1/64 of the final data. The location of each final result in each computing device may be determined based on Table 11. For example, the 1-st row "Node 0" in Table 11 represents that the blocks W01, W02, W03, W04, W05, W06, and W07 in the computing devices D00 to D07 respectively include 1/64 of the final result. The second row "Node 1" in Table 11 represents that the blocks W13, W14, W15, W16, W17, W18, and W12 in the computing devices D10 to D17 respectively include 1/64 of the final result, and so on.

According to an exemplary implementation of the disclosure, each block respectively corresponding to the location of each computing device may be selected from each computing device in the computing array, thereby combining each block into the final result. Specifically, according to the locational relationship shown in Table 11 above, the block W01 may be selected from D00, the block W02 may be selected from D01, . . . , and the block W76 may be selected from D77. Here, the final result represents the result of executing the processing operation on all the source data.

Using the exemplary implementation of the disclosure, the computational load of a complex processing operation may be distributed among the 64 computing devices in the computing array 200. In this way, only 7 iteration processes are needed to implement the processing of all the source data, so the data processing efficiency can be greatly improved. Further, adopting the connection manner of the computing array 200 does not require each computing device to include a large number of connection ports, so the computing capability of the computing device with fewer connection ports may be used as much as possible to implement parallel computation.

Figure 7A:
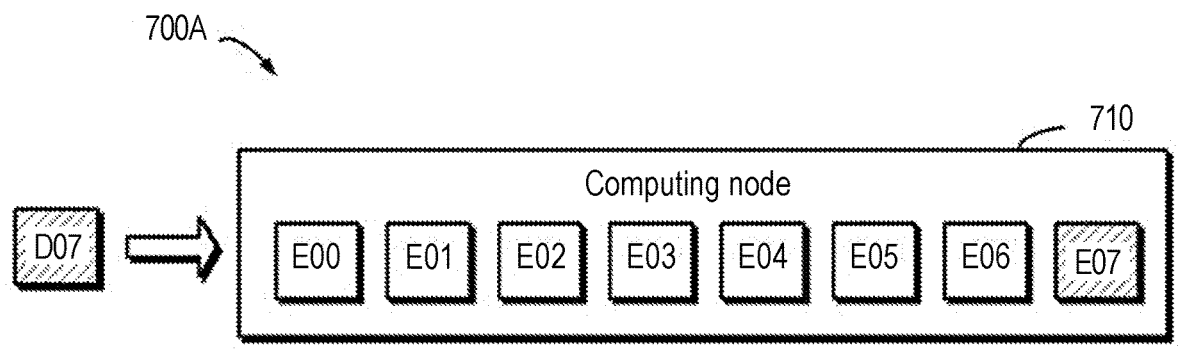
FIG. 7A and FIG. 7B respectively schematically illustrate block diagrams of a process for expanding a computing device in a computing array according to an exemplary implementation of the disclosure.

According to an exemplary implementation of the disclosure, each computing node may further include an expandable second type computing device. The expandable computing device may be replaced by a computing node or a computing array, so that more computing devices may be added to the computing array to implement parallel processing. In the following, more details regarding the expansion will be described with reference to FIG. 7A and FIG. 7B. FIG. 7A schematically illustrates a block diagram of a process 700A for expanding a computing device in a computing array according to an exemplary implementation of the disclosure. In FIG. 7A, the computing device D07 shown as shaded on the left is the expandable computing device. The computing device D07 may be expanded using a computing node 710. The structure of the computing node 710 is similar to the structure of the computing nodes in the computing array 200. For example, the computing device 710 may include 8 computing devices E00, E01, E02, E03, E04, E05, E06, and E07. Here, E00 to E06 may be conventional computing devices, and E07 may be another expandable computing device.

Figure 7B:
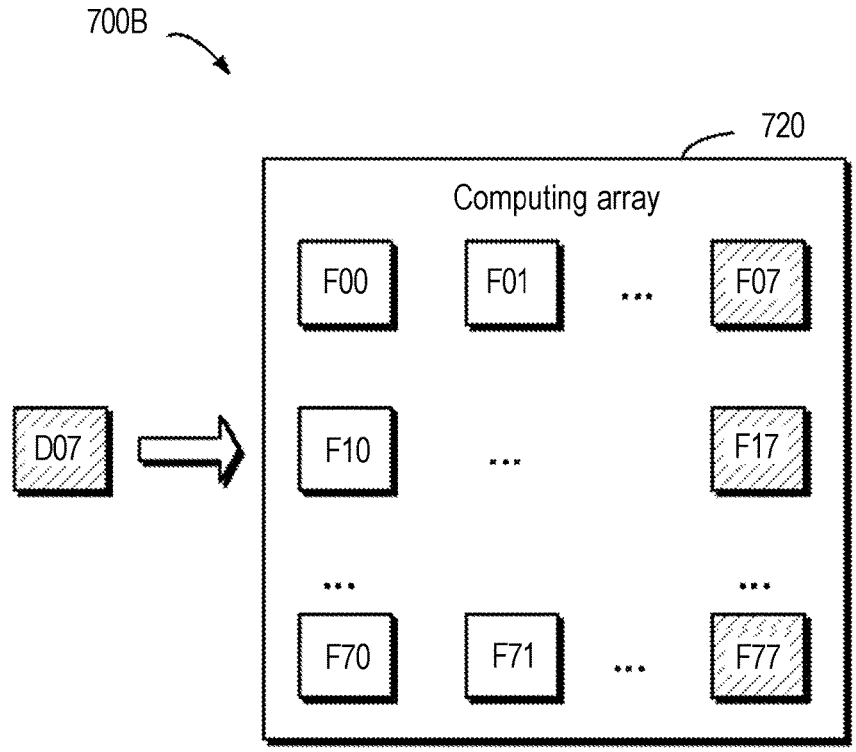

FIG. 7B schematically illustrates a block diagram of a process 700B for expanding a computing device in a computing array according to an exemplary implementation of the disclosure. In FIG. 7B, the computing device D07 shown as shaded on the left is the expandable computing device D07. The computing device D07 may be expanded using a computing array 720. The structure of the computing node 710 is similar to the structure of the computing array 200. For example, the computing device 720 may include 8 computing nodes, and each computing node may include 8 computing devices. For example, the 1-st computing node may include computing devices F00, F01, . . . , and F07, . . . , and the 8-th computing node may include computing devices F70, F71, . . . , and F77. In the computing array 720, the computing devices F07, F17, . . . , and F77 shown as shaded may be expandable computing devices.

Using the exemplary implementation of the disclosure, an expandable hierarchical connection manner is proposed. At this time, the expandable computing devices in different levels may all be replaced with computing nodes or computing arrays, so as to expand the number of computing devices in the original computing array. For example, each expandable device in the computing array may be respectively expanded using the same or different structures. Using the exemplary implementation of the disclosure, the limitation of poor expansibility of the loop connection of the technical solutions in the prior art is eliminated, so that the capacity of the computing array may be expanded in a more convenient and effective manner, so as to provide a higher processing performance.

The steps of the method 300 according to an exemplary implementation of the disclosure have been described above with reference to FIG. 3 to FIG. 7B. In an exemplary implementation of the disclosure, an apparatus for executing a processing operation using a computing array is provided. The computing array includes multiple computing nodes, and a computing node among the computing nodes includes a set of computing devices. The apparatus includes a sharding module, configured to allocate source data to each of the computing nodes in the computing array, wherein the source data includes multiple blocks; a receiving module, configured to respectively receive multiple blocks from multiple other computing nodes other than the computing node among the computing nodes using multiple first type computing devices among the set of computing devices included in the computing node at the computing node among the computing nodes in at least one iteration process; a generating module, configured to execute a processing operation on received blocks using the first type computing devices respectively, so as to generate multiple intermediate results; and an obtaining module, configured to execute a processing operation on the intermediate results to obtain a first part of a final result of executing the processing operation on the source data. In an exemplary implementation of the disclosure, the apparatus may further include a module for executing other steps in the method 300 described above.

Figure 8:
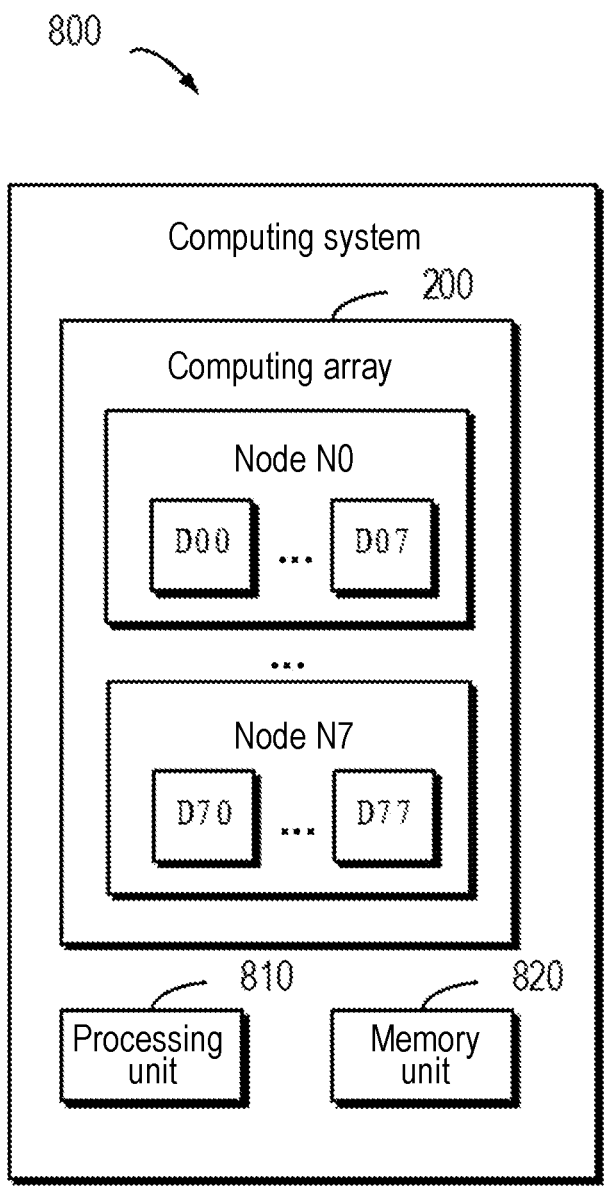
FIG. 8 schematically illustrates a block diagram of a computing system for executing a processing operation using a computing array according to an exemplary implementation of the disclosure.

In the following, a computing system for implementing the above method will be described with reference to FIG. 8. FIG. 8 schematically illustrates a block diagram of a computing system 800 for executing a processing operation using a computing array according to an exemplary implementation of the disclosure. As shown in FIG. 8, the computing system 800 may include the computing array 200. The computing array 200 may include multiple computing nodes (for example, N0 to N7), and each computing node may include multiple computing devices. The computing system 800 may further include a processing unit 810 and a memory unit 820 coupled to the processing unit 810. The memory unit 820 may include a computer-executable instruction for executing the method 300 described above when being executed by the processing unit 810.

According to an exemplary implementation of the disclosure, a computing system is provided, which includes a computing array, including multiple computing nodes, wherein a computing node among the computing nodes includes a set of computing devices; a processing unit; a memory unit, coupled to the processing unit and including a computer-executable instruction that enables the processing unit to execute the following actions when being executed by the processing unit. Source data is allocated to each of the computing nodes in the computing array, and the source data includes multiple blocks. At a computing node among the computing nodes, in at least one iteration process, multiple blocks are respectively received from multiple other computing nodes other than the computing node among the computing nodes using multiple first type computing devices among a set of computing devices included in the computing node. A processing operation is executed on the received blocks using the first type computing devices respectively, so as to generate multiple intermediate results. The processing operation is executed on the intermediate results to obtain a first part of a final result of executing the processing operation on the source data.

According to an exemplary implementation of the disclosure, respectively receiving the blocks from the other computing nodes includes determining a corresponding computing device of a given computing device in the other computing nodes based on a device location of the given computing device in the computing node for the given computing device among the first type computing devices; and receiving a corresponding block among the blocks from the corresponding computing device.

According to an exemplary implementation of the disclosure, determining the corresponding computing device based on the device location includes determining the corresponding computing device based on a node location and a device location of the given computing node in the computing array for the given computing node among the other computing nodes. Also, receiving the corresponding block from the corresponding computing device includes receiving a block associated with the location of the given computing device in the computing array from the corresponding computing device.

According to an exemplary implementation of the disclosure, generating the intermediate results includes executing a processing operation based on a block associated with the location of the given computing device in the computing array among the blocks at the given computing device and the received corresponding block, so as to generate an intermediate result among the intermediate results.

According to an exemplary implementation of the disclosure, determining the first part based on the intermediate results includes instructing the first type computing devices to respectively transmit the intermediate results to next computing devices in the computing node, so as to respectively update blocks corresponding to locations of the first type computing devices at the next computing devices. Also, the method further includes executing a next iteration process at the computing node in response to determining that the number of times of the iteration process being executed does not reach a predetermined threshold. The predetermined threshold is determined based on the number of the computing nodes.

According to an exemplary implementation of the disclosure, executing the next iteration process at the computing node includes respectively receiving multiple updated blocks from the other computing nodes at the first type computing devices; executing a processing operation on the received updated blocks using the first type computing devices respectively, so as to generate multiple updated intermediate results; and determining the first part based on the updated intermediate results.

According to an exemplary implementation of the disclosure, the actions further include determining multiple other parts of the final result generated at the other computing nodes for the other computing nodes; and determining the final result based on the first part and the other parts.

According to an exemplary implementation of the disclosure, determining the final result includes selecting respective blocks respectively corresponding to a location of each computing device from each computing device in the computing array; and combining the respective blocks to determine the final result.

According to an exemplary implementation of the disclosure, the computing node further includes a second type computing device. Also, the method further includes expanding the second type computing device using at least one of an additional computing node including multiple additional computing devices; and an additional computing array including multiple additional computing nodes.

According to an exemplary implementation of the disclosure, each of the computing devices includes at least one of a central processing unit, a central processing unit core, and a graphics processing unit. The processing operation includes at least one of summation, maximum value, minimum value, multiplication, logical AND, logical OR, bitwise AND, and bitwise OR. The number of the computing nodes is equal to the number of the set of computing devices in the computing node, and the number of the blocks is determined based on the number of the computing nodes.

Persons skilled in the art should understand that the steps of the method described herein are not limited to the order exemplarily shown in the drawings, but may be executed in any other feasible order.

The above description of the disclosure is intended for persons skilled in the art to implement or use the disclosure. Various modifications to the disclosure are readily apparent to persons skilled in the art, and the generic principle defined herein may be applied to other transformations without departing from the spirit and scope of the disclosure. Therefore, the disclosure is not intended to be limited to the examples and the designs described herein, but is to be consistent with the widest scope of the principle and the novel features disclosed herein.

What is claimed is:

1. A method for executing a processing operation using a computing array, the computing array comprising a plurality of computing nodes, and a computing node among the computing nodes comprising a set of computing devices, the method comprising:
    allocating source data to each of the computing nodes in the computing array, wherein the source data comprises a plurality of blocks;
    at the computing node among the computing nodes, in at least one iteration process,
        respectively receiving a plurality of blocks from a plurality of other computing nodes other than the computing node among the computing nodes using a plurality of first type computing devices among the set of computing devices included in the computing node;
        executing the processing operation on the received blocks using the first type computing devices respectively to generate a plurality of intermediate results; and
        executing the processing operation on the intermediate results to obtain a first part of a final result of executing the processing operation on the source data,
    wherein respectively receiving the blocks from the other computing nodes comprises: for a given computing device among the first type computing devices, determining a corresponding computing device of the given computing device in the other computing nodes based on a device location of the given computing device in the computing node; and receiving a corresponding block among the blocks from the corresponding computing device.

2. The method according to claim 1, wherein determining the corresponding computing device based on the device location comprises: for a given computing node among the other computing nodes, based on a node location of the given computing node in the computing array and the device location, determining the corresponding computing device; and
    wherein receiving the corresponding block from the corresponding computing device comprises: receiving a block associated with a location of the given computing device in the computing array from the corresponding computing device.

3. The method according to claim 2, wherein generating the intermediate results comprises: based on the block associated with the location of the given computing device in the computing array among a plurality of blocks at the given computing device and the received corresponding block, executing the processing operation to generate an intermediate result among the intermediate results.

4. The method according to claim 1, wherein determining the first part based on the intermediate results comprises:
    instructing the first type computing devices to respectively transmit the intermediate results to multiple next computing devices in the computing node to respectively update blocks corresponding to locations of the first type computing devices at the next computing devices; and the method further comprising:
    in response to determining that a number of times of the iteration process being executed does not reach a predetermined threshold, executing a next iteration process at the computing node, wherein the predetermined threshold is determined based on a number of the computing nodes.

5. The method according to claim 4, wherein executing the next iteration process at the computing node comprises:
    at the first type computing devices, respectively receiving a plurality of updated blocks from the other computing nodes; and
    executing the processing operation on the received updated blocks using the first type computing devices respectively to generate a plurality of updated intermediate results; and
    determining the first part based on the updated intermediate results.

6. The method according to claim 1, further comprising:
  determining a plurality of other parts of the final result generated at the other computing nodes for the other computing nodes; and
  determining the final result based on the first part and the other parts.

7. The method according to claim 6, wherein determining the final result comprises:
  selecting respective blocks respectively corresponding to a location of each of the computing devices from each of the computing devices in the computing array; and
  combining the respective blocks to determine the final result.

8. The method according to claim 1, wherein the computing node further comprises a second type computing device, and the method further comprises: expanding the second type computing device using at least one of:
  an additional computing node comprising a plurality of additional computing devices; and
  an additional computing array comprising a plurality of additional computing nodes.

9. The method according to claim 1, wherein:
  each of the computing devices comprises at least one of a central processor, a central processor unit core, and a graphics processor;
  the processing operation comprises at least one of summation, maximum value, minimum value, multiplication, logical AND, logical OR, bitwise AND, and bitwise OR; and
  a number of the computing nodes is equal to a number of the set of computing devices in the computing node, and a number of the blocks is determined based on the number of the computing nodes.

10. A computing system, comprising:
  a computing array, comprising a plurality of computing nodes, and a computing node among the computing nodes comprising a set of computing devices;
  a processor; and
  a memory, coupled to the processor and comprising a computer-executable instruction, wherein the computer-executable instruction enables the processor to execute following actions when being executed by the processor:
    allocating source data to each of the computing nodes in the computing array, wherein the source data comprises a plurality of blocks;
  wherein at the computing node among the computing nodes, in at least one iteration process, a plurality of first type computing devices among the set of computing devices included in the computing node are configured to:
    respectively receive a plurality of blocks from a plurality of other computing nodes other than the computing node among the computing nodes;
    respectively execute a processing operation on the received blocks to generate a plurality of intermediate results; and
    execute the processing operation on the intermediate results to obtain a first part of a final result of executing the processing operation on the source data,
  wherein a given computing device among the first type computing devices is configured to:
    determine a corresponding computing device of the given computing device in the other computing nodes based on a device location of the given computing device in the computing node; and
    receive a corresponding block among the blocks from the corresponding computing device.

11. The computing system according to claim 10, wherein the given computing device among the first type computing devices is configured to: for a given computing node among the other computing nodes, based on a node location of the given computing node in the computing array and the device location, determine the corresponding computing device; and
  receive a block associated with a location of the given computing device in the computing array from the corresponding computing device.

12. The computing system according to claim 11, wherein the given computing device among the first type computing devices is configured to: based on the block associated with the location of the given computing device in the computing array among a plurality of blocks at the given computing device and the received corresponding block, execute the processing operation to generate an intermediate result among the intermediate results.

13. The computing system according to claim 10, wherein the first part is determined based on the intermediate results, and the processor is configured to:
  instruct the first type computing devices to respectively transmit the intermediate results to multiple next computing devices in the computing node to respectively update blocks corresponding to locations of the first type computing devices at the next computing devices; and
  in response to determining that a number of times of the iteration process being executed does not reach a predetermined threshold, execute a next iteration process at the computing node, wherein the predetermined threshold is determined based on a number of the computing nodes.

14. The computing system according to claim 13, wherein each of the plurality of first type computing devices among the set of computing devices included in the computing node is configured to:
  at the first type computing devices, respectively receive a plurality of updated blocks from the other computing nodes; and
  execute the processing operation on the received updated blocks using the first type computing devices respectively to generate a plurality of updated intermediate results; and
  determine the first part based on the updated intermediate results.

15. The computing system according to claim 10, wherein the processor is configured to:
  determine a plurality of other parts of the final result generated at the other computing nodes for the other computing nodes; and
  determine the final result based on the first part and the other parts.

16. The computing system according to claim 15, wherein the processor is configured to:
  select respective blocks respectively corresponding to a location of each of the computing devices from each of the computing devices in the computing array; and
  combine the respective blocks to determine the final result.

17. The computing system according to claim 10, wherein the computing node further comprises a second type computing device, and the second type computing device is expanded using at least one of:

an additional computing node comprising a plurality of additional computing devices; and an additional computing array comprising a plurality of additional computing nodes.

18. The computing system according to claim 10, wherein:
- each of the computing devices comprises at least one of a central processor, a central processor core, and a graphics processor;
- the processing operation comprises at least one of summation, maximum value, minimum value, multiplication, logical AND, logical OR, bitwise AND, and bitwise OR; and
- a number of the computing nodes is equal to a number of the set of computing devices in the computing node, and a number of the blocks is determined based on the number of the computing nodes.

* * * * *